United States Patent [19]

May

[11] 3,775,876
[45] Dec. 4, 1973

[54] TREE MOVING APPARATUS

[76] Inventor: John D. May, P. O. Box 367, Conway, Ark. 72032

[22] Filed: Sept. 18, 1972

[21] Appl. No.: 290,110

Related U.S. Application Data

[63] Continuation of Ser. No. 66,498, Aug. 24, 1970, abandoned.

[52] U.S. Cl. .................................................. 37/2 R
[51] Int. Cl. ........................................... A01g 23/02
[58] Field of Search ...................................... 37/2 R

[56] References Cited
UNITED STATES PATENTS
| | | | |
|---|---|---|---|
| 1,597,281 | 8/1926 | Mills | 37/2 R |
| 3,364,601 | 1/1968 | Korenek | 37/2 R |
| 3,460,277 | 8/1969 | Grover et al. | 37/2 R |

Primary Examiner—Robert E. Pulfrey
Assistant Examiner—R. E. Suter
Attorney—William S. Dorman

[57] ABSTRACT

A tree moving apparatus mounted on a vehicle and having a plurality of reciprocal blades arranged for positioning thereof around the trunk of a tree and spaced therefrom. The blades are substantially spoon-shaped and pierce the earth surrounding the tree at an angle with respect to the horizontal resulting in an arcuate configuration for the sidewalls of the area being excavated by the blades, and in such a manner as to meet beneath the tree in the form of a substantially semi-spherical container. The earth surrounding the tree is thus severed by the blades and the major roots of the tree are balled or encased within the closed container formed thereby. An inner frame bears against the exposed surface of the ground surrounding the tree and circumscribed by the blades for securely retaining the balled roots in the closed container. The container housing the tree and balled roots may then be elevated from the normal growing position of the tree and tilted to a substantially horizontal position whereupon the tree and contained roots may be transported to a new site for transplanting of the tree. A leveling device facilitates transplanting of the tree in a substantially true vertical position at the new site.

1 Claim, 9 Drawing Figures

PATENTED DEC 4 1973 3,775,876

INVENTOR.
JOHN D. MAY

BY William S. Dorman

ATTORNEY

PATENTED DEC 4 1973
3,775,876
SHEET 2 OF 3
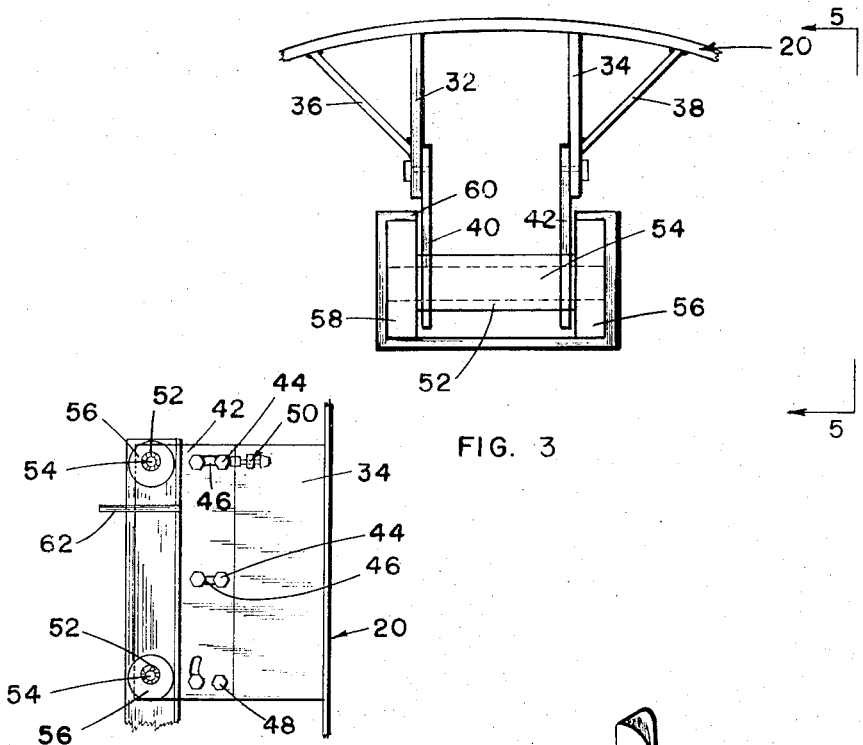
FIG. 3
FIG. 5
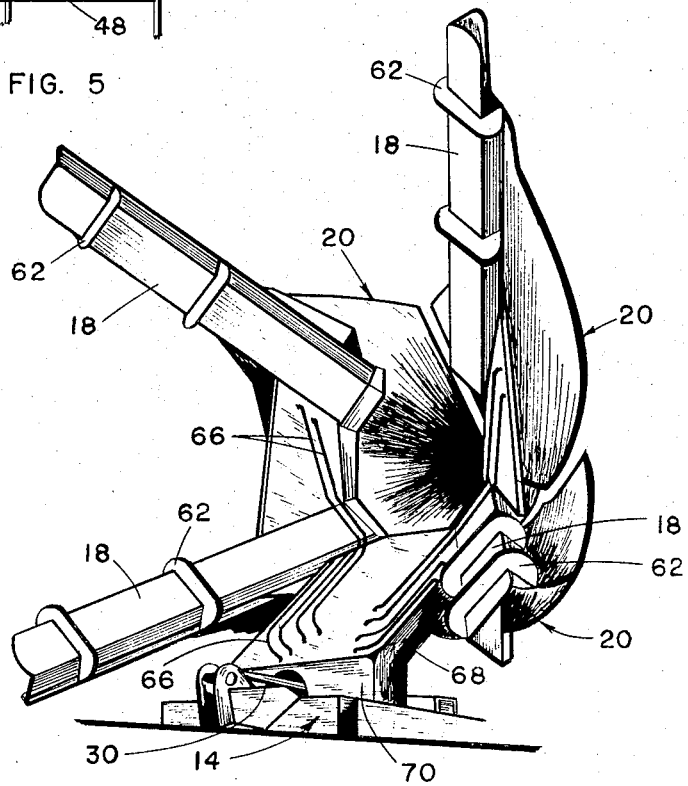
FIG. 4
INVENTOR.
JOHN D. MAY
BY William S. Dorman
ATTORNEY

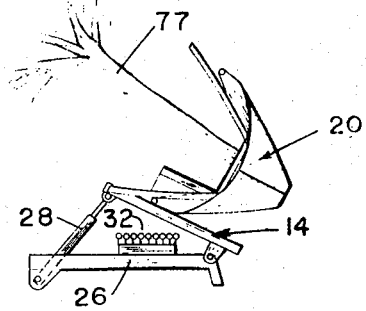
FIG. 6
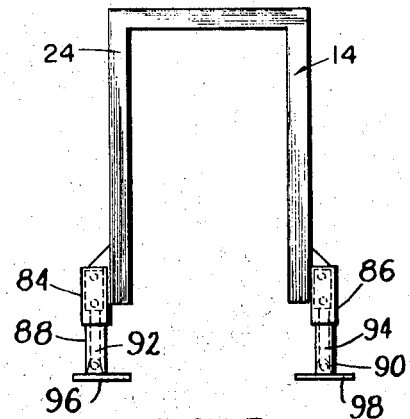
FIG. 7
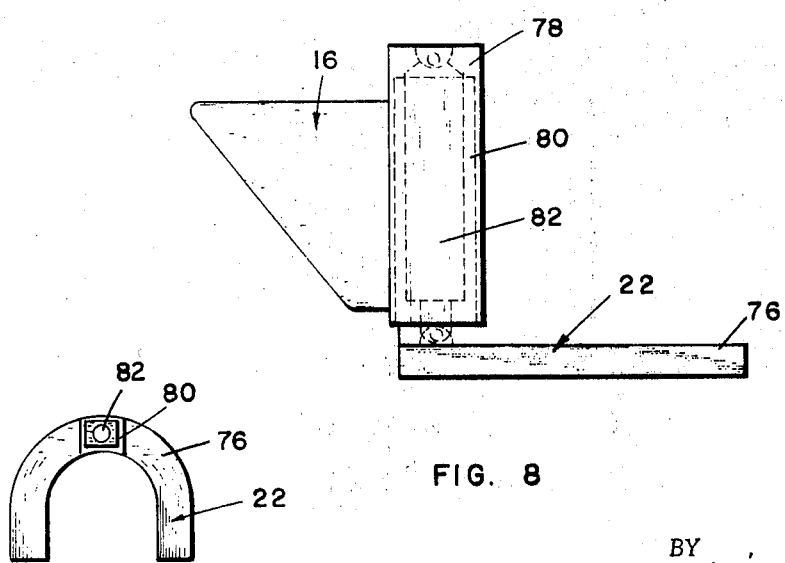
FIG. 8
FIG. 9
INVENTOR
JOHN D. MAY
BY William S. Dorman
ATTORNEY

TREE MOVING APPARATUS

This is a continuation of application Ser. No. 66,498, filed Aug. 24, 1970, now abandoned.

This invention relates to improvements in tree moving apparatus and more particularly, but not by way of limitation, to a vehicle mounted tree moving apparatus having a plurality of reciprocal substantially spoon-shaped blades adapted for piercing the ground surrounding a tree and meeting therebelow to form a closed container for removal of the tree and balled roots.

In the transplanting of trees, and the like, it is important to remove as much of the tree root system as possible when moving the tree from the original growing site. In order to accomplish this, devices have been developed for positioning cutting blades around the trunk of the tree for digging into or piercing the earth surrounding the tree in a manner for removal of as large a ball with the roots as possible. One example of this type of tree moving apparatus is disclosed in the Koreneck U.S. Pat. No. 3,364,601, issued Jan. 23, 1968 and entitled "Apparatus for Excavating Plants for Transplanting." This type of apparatus has certain disadvantages, however, in that the reciprocal cutting blades are mounted within a frame structure which must surround the balled roots of the tree when it is lifted from the original site for transportation to the new location for planting. As a result, the size of a tree which may thus be excavated and moved is limited because of the state and federal highway regulation relating to the width of a load which may be moved along a highway. In addition, it is frequently very difficult to transplant the tree at the new site in a manner wherein the tree is disposed in a substantially true vertical position.

The present invention contemplates a novel tree moving apparatus particularly designed and constructed for overcoming the foregoing disadvantages. The novel apparatus is carried by a suitable vehicle, and comprises a plurality of circumferentially spaced reciprocal blades carried by a main frame which is disposed inwardly with respect to the blades, thus permitting the excavation of larger trees while maintaining the overall width of the tree during moving thereof to a dimension within the legal allowable limits for moving along highways, and the like. Each blade is independently mounted on the main frame and is substantially spoon-shaped in configuration. The blades move in an inwardly directed angled path with respect to the horizontal during the piercing of the earth surrounding the tree, which, as a practical matter, has been found to greatly facilitate the cutting or earth piercing operation. The spoon-shaped configuration of the cutting blades results in an arcuate configuration of the sidewalls of the area being excavated along the cutting path as the blades move angularly with respect to the horizontal, and the blades meet beneath the tree in a manner for forming a closed substantially semi-spherical container encasing a large portion of the tree roots. Each blade is independently adjustable on the main frame, and a supply of water is directed to each blade during the cutting operation for lubricating the blades during a cutting or digging operation. In addition, a movable inner frame is provided which may be disposed against the upper or exposed surface of the earth contained within the closed container for retaining the balled roots securely therein. The blades forming the closed container may be sinultaneously elevated for raising the balled roots and tree from the original growing position, and the container and load carried thereby may then be tilted to a substantially horizontal position for facilitating traveling along the highway to the new site. A leveling device is provided whereby the tree may be positioned in a substantially upright or true vertical position at the new location.

It is an important object of this invention to provide a novel tree moving apparatus having a plurality of spoon-shaped cutting blades movable through an angled path producing an arcuate configuration of the sidewalls of the area being cut away by the blades for facilitating piercing of the earth surrounding the tree to be moved.

It is another object of this invention to provide a novel tree moving apparatus wherein water may be directed to the cutting blades for lubrication thereof to improve the digging operation.

Another object of this invention is to provide a novel tree moving apparatus wherein the blades move together to form a closed container for the balled roots of the tree whereby the tree and roots may be easily removed from the growing position for transplanting thereof.

Still another object of this invention is to provide a novel tree moving apparatus wherein the tree may be easily transplanted and positioned in a substantially true vertical position.

A further object of this invention is to provide a novel tree moving apparatus wherein the blades form a substantially semi-spherical container around the roots of the tree for balling a large portion of the tree roots.

Other and further objects and advantageous features of the present invention will hereinafter more fully appear in connection with a detailed description of the drawings in which:

FIG. 3 is a top view of one of the blades utilized in the invention.

FIG. 4 is a perspective view of a tree moving apparatus embodying the invention and depicted in a substantially horizontal position.

FIG. 5 is a view taken on line 5—5 of FIG. 3.

FIG. 6 is a side elevational view of a tree moving apparatus embodying the invention and depicted in a substantially horizontal position for supporting a tree during transporting thereof.

FIG. 7 is a rear elevational view of a lift device utilized in the invention.

FIG. 8 is a side elevational view of the inner frame utilized in the invention.

FIG. 9 is a schematic top view of the inner frame utilized in the invention.

Figure 1:
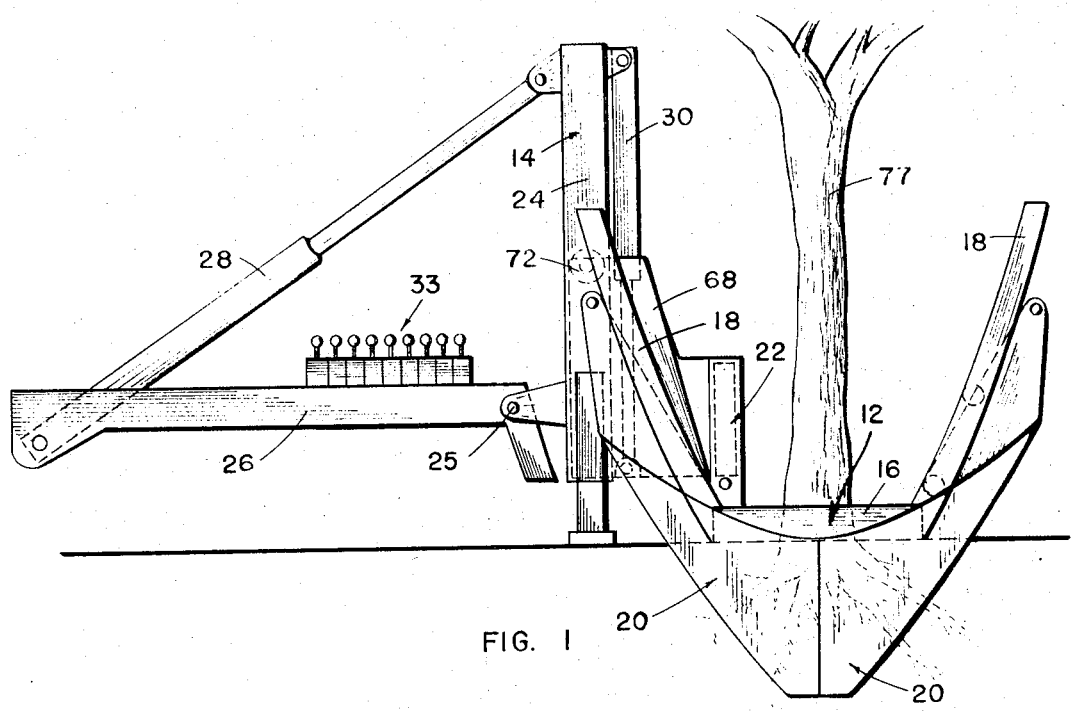
FIG. 1 is a side elevational view of a tree moving apparatus embodying the invention and depicted in position around the roots of a relatively large tree.

Referring to the drawings in detail, reference character 10 generally indicates a tree moving apparatus comprising a main frame portion 12 secured to a lifting apparatus 14 in a manner as will be hereinafter set forth. The main frame may be of any suitable type and as shown herein comprises a substantially rectangular open frame 16 having a plurality of spaced guide channels 18 (only two of which is shown in FIG. 1) extending angularly outward therefrom. A blade 20 is reciprocally secured to each guide channel 18 in a manner as will be hereinafter set forth in detail. An inner frame 22 is disposed within the main frame 16 and movably secured thereto as will be hereinafter set forth. The main frame 16 is also reciprocally secured to the lift apparatus 14 and is reciprocated thereby for a purpose and in a manner as will be hereinafter set forth.

The lifting apparatus 14 is preferably generally similar to the lifting apparatus normally utilized on the usual fork lift type vehicle, and as shown herein comprises a substantially U shaped frame 24 preferably pivotally secured at 25 to a vehicle frame portion 26. The vehicle is not shown in the drawings, and may be of any suitable type, as is well known in vehicle mounted tree moving equipment. A hydraulic cylinder 28 is pivotally secured between the vehicle frame 26 and the lift frame 24 for pivoting of the lift apparatus 14 about the pivot connection 25. A generally similar hydraulic cylinder 30 is suitably secured between the lift frame 24 and the main frame 16 for reciprocating the main frame 16 with respect to the lift apparatus 14. Suitable hydraulic fluid lines (not shown) extend between the cylinders 28 and 30 and a main fluid control center generally indicated at 33 for supplying fluid to the cylinders for actuation thereof, as is well known.

As hereinbefore set forth, the blades 20 are substantially spoon-shaped and are of an arcuate configuration in both the longitudinal and transverse directions. The blades 20 are substantially identical and only one will be described in detail herein. A pair of spaced web members 32 and 34 (FIGS. 3 and 5) are welded or otherwise secured to the rear or inwardly disposed surface of the blade 20 and extend longitudinally along the upper portion thereof. Suitable brace members 36 and 38 are rigidly secured between the webs 32 and 34 and the blade 20 for strengthening of the webs and extension members 40 and 42 are secured to the webs 32 and 34 by a plurality of bolts 44 and slots 46. In addition the webs 32 and 34 are hingedly secured to the extension members 40 and 42 at 48. A suitable adjusting device 50 is provided for cooperation with the bolts 44 and slots 46 to permit adjustment of the blade 20 as will be hereinafter set forth.

A plurality of spacers or sleeves 52 are suitably secured between the inner ends of the extension members 40 and 42, only one sleeve 52 being shown in FIG. 3, but two of which are shown in FIG. 5, and a shaft or wheel axle 54 extends through each sleeve 52. A pair of wheels 56 and 58 are suitably journalled on the opposite ends of each shaft 54. The extension members 40 and 42 extend through a longitudinal opening 60 provided in each guide channel 18, and the wheels 56 and 58 ride in the channel 18 upon reciprocation of the blades 20 for guiding the movement of the blades. Of course, it is preferable to provide a plurality of spaced stiffener members 62 on the channels 18 for strengthening thereof. In addition, a hydraulic cylinder 64 is suitably secured between the main frame 16 and each of the blades 20 for reciprocation of the blades in the respective channels 18. Suitable hydraulic lines, as shown generally at 66 in FIG. 4 extend from the hydraulic control center 33 to each of the cylinders 64 for supplying operating fluid thereto, as is well known.

Figure 2:
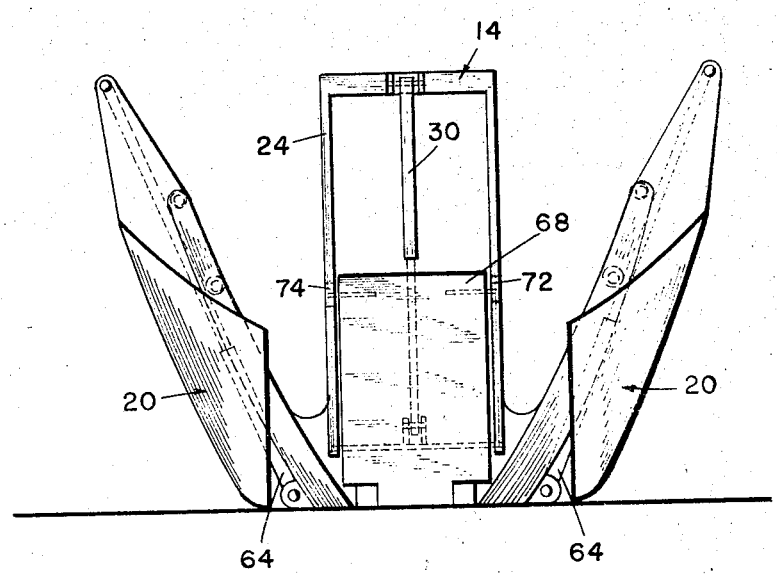
FIG. 2 is a rear elevational view of a tree moving apparatus embodying the invention with the apparatus disposed on the surface of the ground.

The main frame 16 is provided with an angularly extending support member 68 having a connecting member 70 (FIG. 4) provided thereon which is disposed within the U shaped lift frame member 24. The frame 24 is preferably constructed from open channel structural members, or the like, as is well known, and suitable wheels 72 and 74 (FIGS. 1 and 2) are journalled on the opposite sides of the connecting member 70 and ride in the channels of the frame 24 during reciprocation of the main frame 16. As hereinbefore set forth, the hydraulic cylinder 30 is suitably secured between the U-shaped frame 24 and the main frame 16 for transmitting reciprocation to the main frame.

Referring now to FIGS. 8 and 9, the inner frame 22 is disposed inwardly with respect to the main frame 16 and comprises a substantially U shaped base member 76 adapted to surround the trunk of a tree 77 when the apparatus 10 is to be used for trnsplating of the tree, as will be hereinafter set forth. A hollow box 78 is welded or otherwise rigidly secured to the main frame 16, and is preferably of a square or rectangular transverse cross-sectional configuration. An inner box 80 of a smaller but complementary configuration to the box 78 is secured to the U-shaped base member 76 and is concentrically disposed within the outer box 78 for reciprocation therein. A hydraulic cylinder 82 is disposed within the inner box 80 and is suitably secured between the outer box 78 and the base member 76 whereby the base member 76 may be moved with respect to the main frame 16 for a purpose and in a manner as will be hereinafter set forth.

Substantially identical outer boxes 84 and 86 are welded or otherwise secured to the opposite sides of the U-frame 24 as particularly shown in FIG. 7. The boxes 84 and 86 are preferably of substantially square cross-sectional configuration, and complementary inner boxes 88 and 90 respectively, are slidably disposed within the outer boxes 84 and 86. Suitable hydraulic cylinders 92 and 94, are secured between the complementary pairs of inner and outer boxes to provide for relative longitudinal movement therebetween. A foot or stabilizer plate 96 and 98 is secured to the lower end of the inner boxes 88 and 90, respectively, and rest on the surface of the ground during use of the apparatus 10, as will be hereinafter set forth.

OPERATION

When it is desired to remove the tree 77 from its original growing site and transplant the tree to a new location, the apparatus 10 is initially transported to the new location by the vehicle (not shown) as is well known. The apparatus 10 is positioned at the new site and with the blades 20 in the spaced apart position and with the lower cutting edges thereof adjacent the surface of the earth. The hydraulic fluid control center 33 is operated in the usual or well known manner to supply any suitable fluid to the cylinders 64 of each blade 20 whereby the blades 20 are moved downwardly for piercing or digging into the earth.

As hereinbefore set forth each blade 20 is of arcuate configuration in both the longitudinal and transverse dimensions, and the angle of each blade 20 with respect to the surface of the earth may be adjusted by the adjusting device 50. The blade 20 will pivot about the hinge 48 and the bolts 44 and slots 46 permit adjustment of the angular position of the blade, as will be readily apparent. As the cylinders 64 urge the blades 20 downwardly through the earth, the path of travel of each blade 20 will be angular with respect to the horizontal. The spoon-shaped configuration of the blades 20, however, result in the scooping out of an arcuate surface at the excavation area as the blades move in this angular direction. This facilitates the piercing action. In addition, water is supplied independently to each blade for lubrication thereof and for facilitating the penetration of the blades into the earth, in any suitable manner (not shown) such as by a usual water hose, bucket, or the like.

As the blades 20 penetrate the earth, they move together to form a closed container encasing the portion of earth disposed therein. The cylinder 30 may then be activated for lifting the closed blades and the earth contained therein simultaneously. Of course, the cylinder 82 may be activated for moving the U-shaped base member 76 of the inner frame member 22 into a position bearing against the exposed surface of the earth contained between the closed blades for securely retaining the dirt therein. The earth removed from the new location may be disposed of in any well known manner, and it will be apparent that a hole is thus provided for receiving the tree 77 to be planted at the new location.

The apparatus 10 may then be moved to the original growing site of the tree 77, and the main frame 16 may be moved into a position surrounding the tree 77. As hereinbefore set forth, the frame 16 is of an open type construction and may be easily positioned around the tree. If desired, however, the frame 16 may be constructed in a sectional manner with suitable hinges for opening and closing of the frame 12 around the tree 77. The blades 20 may be activated as hereinbefore set forth for cutting into the earth around the tree 77. If the tree 77 is relatively large, as shown in FIG. 1, the lifting apparatus 14 may be utilized for lowering the main frame 12 to a position wherein the base frame portion 16 there rests on the surface of the ground surrounding the tree. In this position, the blades 20 will be moved to the greatest depth of penetration thereof beneath the tree prior to the coming together thereof. This assures the severing of a relatively large portion of the tree roots and ball of earth therearound. If the tree 77 is relatively small, the lifting apparatus 14 may be utilized for lifting the main frame 12 to an upper position or to a preselected position spaced above the ground surface (this position is not shown in the drawings). The U-shaped member 76 may then be lowered by the cylinder 82 to a position adjacent the surface of the ground surrounding the tree and thus, during a tree moving operation, the inner frame 22 fuctions in a manner similar to the main frame base member 16 hereinbefore set forth. In this position of the main frame and inner frame, the blades 20 will be brought together beneath the tree 77 at a depth less than the maximum depth of penetration of the blades. It will be readily apparent that the depth of penetration of the blades 20 may be selected as desired by the elevation of the frame 12 above the surface of the ground, and by the use of the inner frame 22 during the moving of the smaller trees.

·As hereinbefore set forth, the blades 20 are of an arcuate or spoon-shaped configuration, and this configuration permits a thinner construction for the blades, thus greatly facilitating the penetration of the earth during the diggin operation. It is preferable to direct a stream of water to and along the length of each blade during the cutting operation for facilitating the digging in any suitable manner (not shown), such as by the usual or well known hose, a bucket, or the like.

When the blades 20 have been moved to the closed position thereof, for forming the substantially semi-spherical closed container around the balled roots, the inner frame 22 may be lowered into a position adjacent the exposed upper surface of earth contained within the closed container, if the frame 22 isn't already in this position. The force of the inner frame 22 against the earth firmly retains the balled roots within the closed chamber. In this position, the lifting apparatus may be utilized for simultaneously lifting the main frame 12, closed container, balled roots contained therein, and tree thus lifting the tree from the original growing position. As soon as the tree has been sufficiently elevated for clearing the ground or earth, the cylinder 28 may be actuated for tilting the lifting device 14, frame 16, and tree 77 to a substantially horizontal position as shown in a reduced scale in FIG. 6. This transfers the weight of the tree and balled roots to the vehicle frame 26. The tree may then be moved from the site of the original growing position to the site of the newly formed hole at the new location. It will be apparent that the previous excavation of the hole at the new location will provide an opening in the earth substantially identical with the configuration of the closed container encasing the tree and roots.

The cylinder 28 may then be actuated for raising the apparatus 10 and tree 77 to a substantially upright or vertical postion, and the lifting device 14 may be utilized for lowering the closed container and balled roots into the hole at the new location. The cylinders 90 and 92 may be extended or retracted in the manner of a telescoping means in conjunction with the cylinder 28 for leveling the position of the tree within the new hole in order to assure that the tree is disposed in a substantially true vertical position, regardless of the terrain or condition of the surface of the earth at the new location, as compared to the surface of the earth at the previous location. The plates 96 and 98 are suitably pivotally secured to the respective inner boxes 88 and 90, and the leveling device permits a universal leveling action to place the tree in an upright or vertical position.

When the tree 77 has been thus properly placed in the desired new position, the cylinders 64 may be properly actuated for withdrawing the blades 20 from the penetrating position thereof. It is preferable to retain the inner frame 22 in position against the upper surface of the balled roots contained between the blades 20 during this withdrawal operation. Subsequent to the removal of the blades from the earth, the frame 22 may be further lowered in order to securely press the balled roots within the new hole, thus "making up" for any space which might otherwise remain upon removal of the blades.

The apparatus 10 may then be moved from position around the newly transplanted tree, and the entire operation may be repeated as desired for moving additional trees.

From the foregoing it will be apparent that the present invention provides a novel tree moving apparatus wherein a plurality of cutting blades may be utilized for efficiently penetrating the earth around the tree to be moved. The blades are of an arcuate configuration in both the longitudinal and transverse directions and enter the ground at an arcuate angle for greatly facilitating the penetration of the earth. In addition, the blades are exteriorly disposed with respect to the main frame thus permitting transplanting of large trees. A movable inner frame is provided for cooperating with the blades in a closed position for securely retaining the tree and balled roots therebetween during transport of the tree to a new site. In addition, water is supplied to the blades during the operations for facilitating the penetration of the earth. The blades are each adjustable on the respective track, and the cutting path is preferably adjustable from approximately four degrees to eighteen degrees from the angle of penetration of the earth. In addition, a leveling device is provided for facilitating positioning of the transplanted tree in the new cavity in a substantially true vertical position. Furthermore, a movable inner frame is provided for facilitating retaining of the tree in the moving apparatus during transportation from the original site to the new site, and for facilitating ultimate placing of the tree in the new location.

Whereas the present invention has been described in particular relation to the drawings attached hereto, it should be understood that other and further modifications, apart from those shown or suggested herein, may be made within the spirit and scope of this invention.

What is claimed is:

1. A vehicle mounted tree transplanting apparatus comprising a main frame having an opening therein for disposition of the frame around a tree, a lifting device secured to the vehicle and operably connected with the main frame for reciprocation thereof, a plurality of reciprocal cutting blades independently carried by the frame and mounted externally with respect thereto, said cutting blades being of a substantially spoon-shaped configuration, an inner frame disposed within the main frame and having an opening therein for partially surrounding the tree, means securing the inner frame to the main frame for reciprocation of the inner frame with respect to the main frame, means operably connected with the lifting device for varying the angular position thereof between substantially vertical and substantially horizontal, leveling means provided on the lifting device for cooperating therewith and for cooperating with the last mentioned means to facilitate universal leveling of the transplanted tree, said main frame comprising a rectangular frame member having one side thereof open for receiving the tree therein, a plurality of guide channels extending angularly outwardly from the said rectangular frame member, each guide channel receiving one of said blade members thereon, means operably connected between the blade members and respective guide channels for providing independent movement of the reciprocal blades, said blades being directed at an angle with respect to the horizontal during reciprocation thereof, and said spoon-shaped configuration of the blades resulting in an arcuate sidewall configuration for the area being excavated by the blades during said reciprocal movement, said inner frame comprising a substantially U-shaped base member disposed within the rectangular frame member of the main frame, and hydraulically actuated means operably connected between the U-shaped base member and main frame for providing reciprocation of the inner frame with respect to the main frame, and wherein the hydraulically actuated means comprises a first box secured to the main frame, a second box secured to the inner frame and reciprocal with respect to the first box, and hydraulic cylinder means operably connected between the first and second boxes for reciprocation of the inner frame with respect to the main frame.

* * * * *